(12) United States Patent
Gagnon et al.

(10) Patent No.: US 9,410,654 B2
(45) Date of Patent: Aug. 9, 2016

(54) APPARATUS FOR REHABILITATING AN UNDERGROUND WATER CONDUIT AND DETECTING AND DRILLING A SERVICE ENTRANCE IN THE CONDUIT

(71) Applicant: Sanexen Environmental Services Inc., Varennes (CA)

(72) Inventors: Gilles Gagnon, Repentigny (CA); Charles Gervais-Dumont, Montreal (CA); Jason Duff, Montreal (CA); Pierre-Hugues Lanneville-Vezina, Varennes (CA)

(73) Assignee: Sanexen Environmental Services Inc., Varennes (CA)

( * ) Notice: Subject to any disclaimer, the term of this patent is extended or adjusted under 35 U.S.C. 154(b) by 174 days.

(21) Appl. No.: 14/489,510

(22) Filed: Sep. 18, 2014

(65) Prior Publication Data

US 2015/0069060 A1 Mar. 12, 2015
US 2016/0069500 A9 Mar. 10, 2016

Related U.S. Application Data

(62) Division of application No. 13/623,332, filed on Sep. 20, 2012, now Pat. No. 8,864,418.

(51) Int. Cl.
| | | |
|---|---|---|
| *F16L 55/11* | (2006.01) | |
| *F16L 55/18* | (2006.01) | |
| *F16L 55/179* | (2006.01) | |
| *F21V 33/00* | (2006.01) | |
| *F21W 131/40* | (2006.01) | |

(52) U.S. Cl.
CPC .............. *F16L 55/11* (2013.01); *F16L 55/179* (2013.01); *F16L 55/18* (2013.01); *F21V 33/006* (2013.01); *F21W 2131/40* (2013.01)

(58) Field of Classification Search
CPC ............ G01V 3/08; G01V 3/081; G01V 3/12
USPC .......................... 138/89, 92, 94, 104; 343/721; 340/686.2
See application file for complete search history.

(56) References Cited

U.S. PATENT DOCUMENTS

| 2,663,451 | A | * | 12/1953 | Yarnall | .................. | B65D 39/00 |
|---|---|---|---|---|---|---|
| | | | | | | 220/284 |
| 2,878,342 | A | * | 3/1959 | Arthur | .................... | B03C 1/282 |
| | | | | | | 200/61.09 |
| 3,753,091 | A | | 8/1973 | Daspit | | |
| 3,758,050 | A | * | 9/1973 | Watts | .................... | B08B 9/0551 |
| | | | | | | 104/138.2 |

(Continued)

*Primary Examiner* — Thomas B Will
*Assistant Examiner* — Katherine Chu
(74) *Attorney, Agent, or Firm* — Reed Smith LLP

(57) ABSTRACT

An apparatus for rehabilitating an underground water conduit having at least one service entrance including a plug having a light emitter which is responsive to the presence of an electromagnetic field, wherein the at least one service entrance is plugged with the plug and a semi-transparent membrane lining the internal surface of the underground water conduit thereby covering the plug. A drilling head is disposed on a body moveable within the underground water conduit, the drill head having a drill bit and a coil inductor concentric with the drill bit. The coil inductor is adapted to generate an electromagnetic field near the drilling head, wherein the light emitter of the plug is adapted to be turned on by the electromagnetic field emitted by the coil inductor to allow visual alignment of the drill bit with the light emitted by the light emitter through the semi-transparent membrane. The plug is drilled with the drill bit through the semi-transparent membrane in order to reopen the at least one service entrance.

8 Claims, 5 Drawing Sheets

(56) References Cited

U.S. PATENT DOCUMENTS

| | | | |
|---|---|---|---|
| 4,061,965 A | 12/1977 | Nelson | |
| 4,310,797 A * | 1/1982 | Butler | G01V 3/08 324/228 |
| 4,402,641 A * | 9/1983 | Arff | F16B 19/004 24/297 |
| 4,951,758 A | 8/1990 | Sonku et al. | |
| 5,054,512 A * | 10/1991 | Jiles | F16L 41/06 137/317 |
| 5,151,657 A * | 9/1992 | Tashjian | G01V 3/08 324/326 |
| 5,417,112 A * | 5/1995 | Rosenberg | G01B 7/003 324/207.22 |
| 5,497,807 A | 3/1996 | Rogers | |
| 5,558,130 A * | 9/1996 | McCabe | F16L 55/1141 138/89 |
| 6,223,776 B1 * | 5/2001 | Glassell | F16L 55/10 138/89 |
| 6,494,463 B1 * | 12/2002 | Rank | E04G 23/0203 138/89 |
| 7,591,901 B1 | 9/2009 | Weisenberg | |
| 8,231,629 B2 | 7/2012 | Lerner et al. | |
| 8,264,226 B1 * | 9/2012 | Olsson | G01V 3/15 324/326 |
| 8,766,638 B2 * | 7/2014 | Nielsen | 324/329 |
| 2008/0278154 A1 * | 11/2008 | Krapf | G01V 3/08 324/233 |
| 2008/0314468 A1 * | 12/2008 | Houghton | F16L 1/11 138/89 |
| 2009/0095211 A1 * | 4/2009 | Johns | B01J 8/0015 116/201 |
| 2009/0272452 A1 | 11/2009 | Cain et al. | |
| 2010/0078895 A1 * | 4/2010 | Sudano | F16L 55/1612 277/316 |
| 2010/0090700 A1 * | 4/2010 | Nielsen | G01V 3/15 324/329 |
| 2010/0307604 A1 * | 12/2010 | German | F16L 55/124 137/15.08 |
| 2013/0127470 A1 * | 5/2013 | Olsson | G01V 3/104 324/326 |
| 2013/0156506 A1 | 6/2013 | Dalby | |
| 2013/0157713 A1 * | 6/2013 | Stolarczyk | H04M 1/026 455/550.1 |
| 2014/0152300 A1 * | 6/2014 | Keith, III | G01V 3/08 324/259 |
| 2014/0175100 A1 * | 6/2014 | Foresman | B65D 39/0029 220/305 |

* cited by examiner

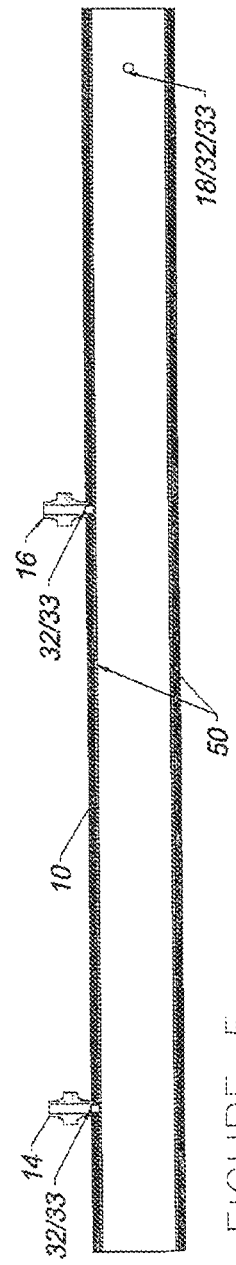
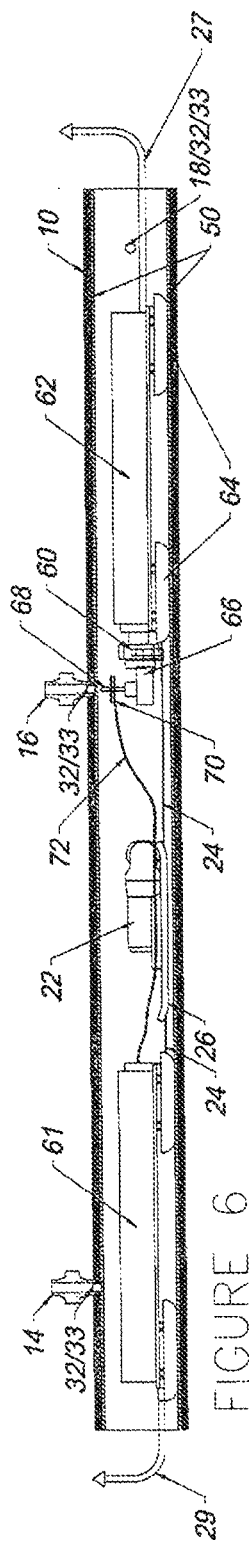

APPARATUS FOR REHABILITATING AN
UNDERGROUND WATER CONDUIT AND
DETECTING AND DRILLING A SERVICE
ENTRANCE IN THE CONDUIT

CROSS-REFERENCE TO RELATED
APPLICATION

This application is a divisional application of, and claims the benefit under 35 U.S.C. §120 of the earlier filing date of, U.S. patent application Ser. No. 13/623,332, filed on Sep. 20, 2012, the entire contents of which are incorporated herein by reference.

TECHNICAL FIELD

The present invention relates to a method for rehabilitating an underground water conduit and apparatus for detecting and drilling service entrances in an underground water conduit that have been previously plugged and covered by an internal lining during the rehabilitation process of the underground conduit.

BACKGROUND

Underground water main conduits and/or sewage conduits that have been installed decades ago have gradually deteriorated to the point where pressurized treated water escapes through cracks and holes at rates that can reach 50%. Similarly. Sewage conduit may have become so deteriorated that a substantial amount of sewage water seeps into the environment instead of being delivered to treatment facilities before re-entering the environment.

For many years now, technologies have been developed and used to rehabilitate damaged water and sewage conduits. The various technologies basically consist of re-lining the inside walls of existing underground conduits to rehabilitate the underground conduits.

U.S. Pat. No. 5,497,807 describes a method of rehabilitating damaged conduits which consists of inserting a replacement pipe into the existing conduit and filling the gap between the new and old pipe with a filling agent. However, this technology is limited to segments of conduit that do not have side pipes or branch lines connected thereto since those would be blocked permanently. If used in conduits with multiple service entrances or branch lines, each service entrance and branch line would have to be individually reconnected to the main conduit which would require digging the ground up to drill out the rehabilitated conduit and reconnecting each branch line which is expensive and time consuming.

U.S. Pat. No. 4,951,758 describes a method of rehabilitating damaged conduits which consists of initially plugging the service entrances of the existing conduit with a water plug carrying a position marker oscillating with a predetermined resonance frequency with a plug setting robot controlled by a technician looking through a video camera connected to the plug setting robot and thereafter lining the existing conduit internally with a continuous strip of synthetic resin wound spirally and filling the gap between the new and old pipelines with a filling agent. Once the re-lining of the existing conduit is done, the water plug can be located with a detection and drilling robot using a loop antenna connected to signal processing circuits which recognise the frequency of the position marker and relay the intensity of the signal to the operator through a graphic display allowing the operator to zero in on the center of the water plug by moving the robot past the water plug until the signal diminishes in the horizontal direction and repeating the process in the radial direction. Once the center of the water plug is located, the water plug is drilled out using a drill mounted on the robot which is operated by the technician. Problems may arise when there are multiple water plugs in the same area giving rise to multiple signals. To alleviate this problem, water plugs with position marker having different resonance frequencies are used when multiple service entrances and branch lines in close proximity to each other need to be plugged.

The method described in U.S. Pat. No. 4,951,758 works reasonably well but the detection process requiring multiple passes over the position marker of the water plugs in order to zero in on the center of the water plugs is somewhat tedious and time consuming. As well, the use of water plugs with position marker having different resonance frequencies requires a selection of water plugs to be carried inside the conduit by the robot during the plug setting operation to prevent having to return above ground for water plugs with different resonance frequencies.

Therefore, there is a need for a method and apparatus for detecting and drilling plugged service entrances in a conduit after rehabilitation of the conduit which would be less time consuming and eliminate some of the drawbacks of prior art methods.

SUMMARY

Example embodiments of the present method and apparatus for rehabilitating a water or sewer conduit ameliorate at least some of the inconveniences present in the prior art.

Example embodiments of the present method and apparatus for detecting and drilling service entrances in a conduit after rehabilitation of the conduit increase the speed of the operation.

In one aspect, the invention provides a method for rehabilitating an underground water conduit having at least one service entrance, the method comprising the steps of: plugging the at least one service entrance with a plug having a light emitter which is responsive to the presence of an electromagnetic field; lining the internal surface of the underground water conduit with a semi-transparent membrane thereby covering the plug; with a drilling head having a drill bit and a coil inductor concentric with the drill bit, the coil inductor being adapted to generate an electromagnetic field near the drilling head, generating an electromagnetic field while moving the drilling head inside the underground water conduit until the light emitter of the plug is turned on by the electromagnetic field; visually aligning the drill bit with the light emitted by the light emitter through the semi-transparent membrane; and with the drill bit, drilling the plug in order to reopen the at least one service entrance.

In another aspect, the invention further comprises a camera connected to a television monitor aboveground which is positioned in front of the drilling head for visually detecting the light emitted by the light emitter through the semi-transparent membrane and for aligning the drill bit with the light emitted by the light emitter.

In another aspect, the invention provides a service entrance plug to be used in the method for rehabilitating an underground water conduit comprising at least one an antenna coil connected to the light emitter, the antenna coil being adapted to generate an electrical current when subjected to an electromagnetic field that will turn on the light emitter.

Embodiments of the present invention each have at least one of the above-mentioned aspects, but do not necessarily have all of them.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where:

FIG. 4a is a schematic side exploded view of the service entrance plug having a light emitting device of FIG. 4a;

FIG. 5 schematic cross-sectional view of the deteriorated underground water main conduit of FIG. 1 after a rehabilitation lining has been installed therein;

FIG. 6 is a schematic cross-sectional view of the rehabilitated underground water main conduit of FIG. 5 and a plug detection and drilling robot and camera assembly therein;

DETAILED DESCRIPTION

Figure 1:
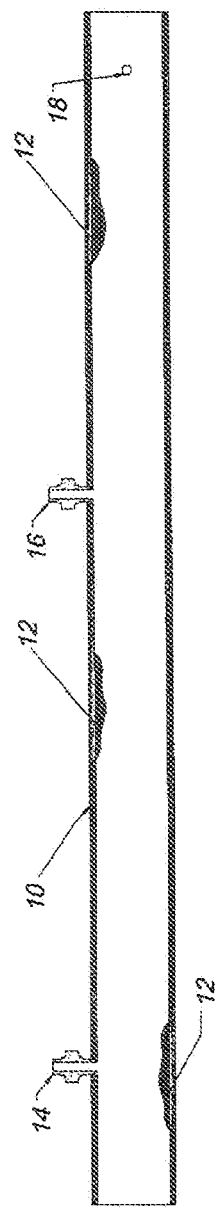
FIG. 1 is a schematic cross-sectional view illustrating a deteriorated underground water main conduit having three service entrances.

FIG. 1 depicts a segment of an underground water main conduit 10 which is in an advance state of deterioration. Water main conduit 10 includes multiple holes, cracks or punctures 12 caused by excessive rust, cracks or soil movements, for example, that allow pressurized water to escape from the water main conduit 10 into the soil, generating drops in pressure and considerable waste of treated water. Water main conduit 10 includes three service entrances 14, 16 and 18 linking water main conduit 10 to households or businesses supplying fresh water to the occupants.

When a segment of an underground water main conduit is in a state of deterioration as water main conduit 10 is depicted in FIG. 1, two options are available: Replacing the entire segment which entails the costly and time consuming process of digging the ground up to remove the segment of water main conduit 10 and install a new segment, or re-lining the inside walls of the underground water main conduit 10 to cover and close the multiple holes, cracks or punctures 12 and restore the inside walls of the water main conduit 10 which is less expensive and time consuming.

Figure 2:
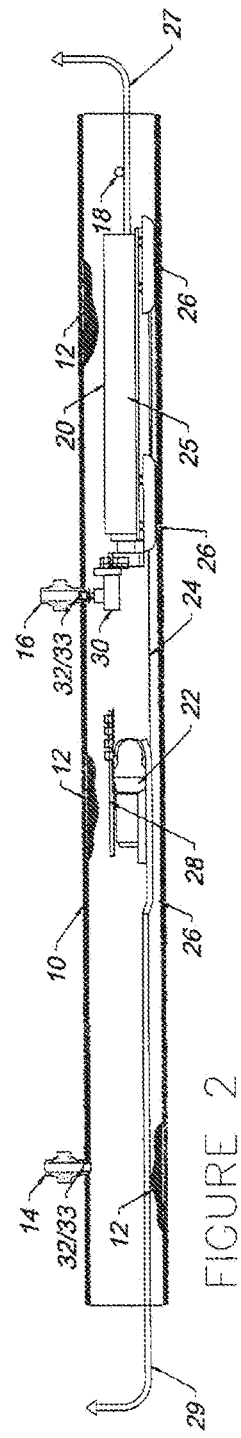
FIG. 2 is a schematic cross-sectional view of the deteriorated underground water main conduit of FIG. 1 and a plug dispensing and setting robot and camera assembly therein.

The process of re-lining a segment of underground water main conduit 10 requires that the service entrances 14, 16 and 18 be plugged prior to re-lining the water main conduit 10 to prevent any resin from seeping into the service entrances and clogging them. As illustrated in FIG. 2, a plug setting robot 20 connected to a closed circuit camera 22 through a tension cable 24 at a predetermined distance are introduced together into the water main conduit 10. The plug setting robot 20 and the camera 22 are respectively connected to tension cables 27 and 29 which are connected to a pair of winches (not shown) located above ground and operated by a technician. The assembly of the plug setting robot 20 and camera 22 is moved back and forth inside the water main conduit 10 by actuated one of the winches which pulls on one of the tension cables 27 and 29 while the other winch offers little resistance. The assembly of the plug setting robot 20 and camera 22 is remotely operated by the technician looking at a television monitor (not shown) relaying live images captured by the camera 22.

The plug setting robot 20 comprises a main body 25 housing a power unit and actuator for controlling a dispensing head 30 positioned at the front of the plug setting robot 20. The dispensing head 30 which is rotatable about an axis extending in a horizontal direction and movable back and forth in the horizontal direction for precise alignment with one of the service entrances 14, 16 or 18. The dispensing head 30 is also movable in the radial direction to press a plug 32 into the service entrances. On top of the camera 22 is a magazine 28 housing a series of plugs 32 aligned so that they may be retrieved one by one by the dispensing head 30. The plug setting robot 20 and the camera 22 are mounted on low friction pads 26 such that they can slide onto the bottom surface of the inside wall of the water main conduit 10.

In operation, the technician, looking at a television monitor, moves the plug setting robot 20 to align the dispensing head 30 with one of the service entrances 14, 16 or 18. The dispensing head 30 is then moved forward to retrieve a plug 32 or 33 from the magazine 28 located on top of the camera 22 and returned to its position in line with the service entrance 16 as illustrated FIG. 2. Minute adjustments are made in the radial direction by the technician viewing the alignment through his monitor and then the plug 32 or 33 is inserted and pressed into the service entrance 14 by the dispensing head 30 moving towards the service entrance 16. The dispensing head 30 is then retrieved and the technician moves the assembly of the plug setting robot 20 and camera 22 by actuating the winches to align the dispensing head 30 with another service entrance and the cycle is repeated until all the service entrances 14, 16 or 18 are plugged.

Figure 3:
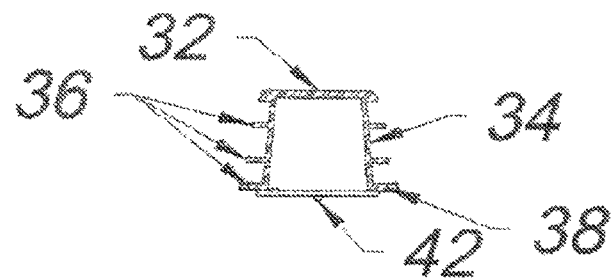
FIG. 3 is a schematic side elevational view of a service entrance plug having a light emitting device in accordance with one embodiment.

As illustrated in FIG. 3, a first embodiment of the plug 32 includes of a conical hollowed body 34 made of a soft plastic surrounded by a series of flexible winglets 36 adapted to bend when plug 32 is inserted into the service entrance in order to efficiently seal the service entrance. The body 34 has first and second ends, wherein the smaller diameter first end is adapted to be inserted into a service entrance and the larger diameter second end is adapted to be visually seen within the underground water conduit. The bottom winglet 38, disposed on the second end, has a larger diameter than the flexible winglets 36, is marginally thicker than flexible winglets 36 and is designed to rest on the edge or perimeter of the service entrance.

Figure 3A:
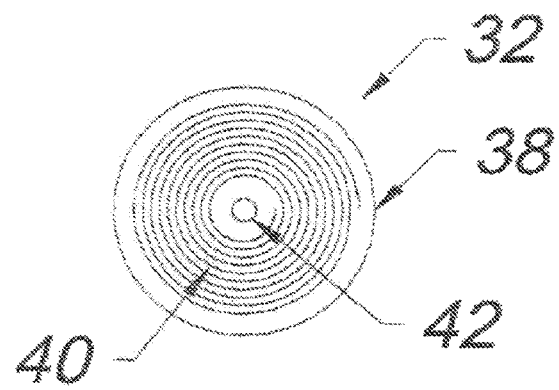
FIG. 3a is a schematic bottom plan view of the service entrance plug having a light emitting device of FIG. 3.

As illustrated in FIG. 3a, the bottom winglet 38 includes an antenna coil 40 connected to a light emitter 42 located exactly in the center of the winglet 38. The antenna coil 40 is adapted to generate a small electrical current when subjected to an electromagnetic field that will turn on the light emitter 42.

Figure 4:
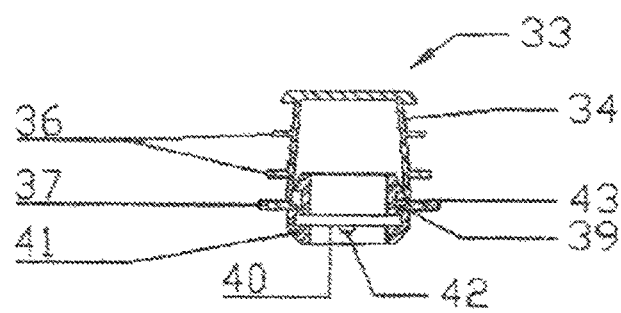
FIG. 4 is a schematic side elevational view of a service entrance plug having a light emitting device in accordance with a second embodiment.
Figure 4A:
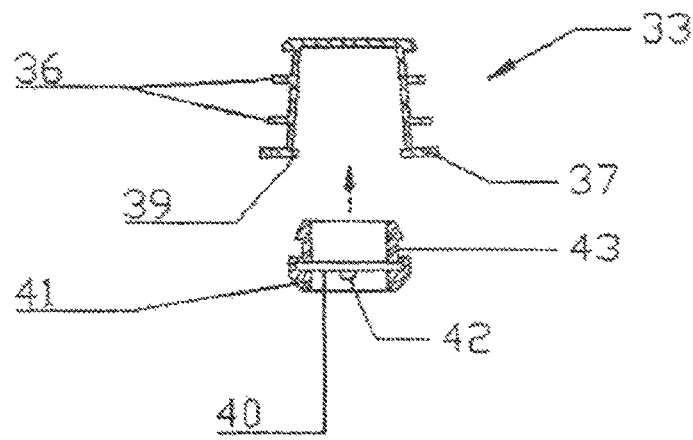

With reference to FIGS. 4 and 4a, a second embodiment of a plug is illustrated consisting of a two-piece plug 33 which also includes of a conical hollowed body 34 made of a soft plastic surrounded by a series of flexible winglets 36 adapted to bend when the hollowed body 34 is inserted into the service entrance in order to efficiently seal the service entrance. The body 34 has first and second ends, wherein the smaller diameter first end is adapted to be inserted into a service entrance and the larger diameter second end is adapted to be visually seen within the underground water conduit. The body 34 includes, in its second end, a receptacle winglet 37 having a larger diameter than the flexible winglets 36 designed to rest on the edge or perimeter of the service entrance. The receptacle winglet 37 extends inwardly to define an annular lip 39 adapted to hold a cap 41 which is snapped into the annular lip 39 of the receptacle winglet 37 as shown in the exploded view of FIG. 4a by the dotted arrow. The snap-on cap 41 includes a groove 43 which secures the snap-on cap 41 to the annular lip 39 of the receptacle winglet 37. The antenna coil 40 and light emitter 42 shown in FIG. 3a are embedded in the snap-on cap 41.

In operation, the installation of the two-piece plug 33 into the service entrances 14, 16 and 18 may be a one step process in which the assembled two-piece plug 33 including the cap 41 is inserted and pressed into the service entrances by the plug setting robot 20 as previously described, or a two step process in which the body 34 of the two-piece plug 33 is first inserted and pressed into a service entrance by the plug setting robot 20 and then the plug setting robot 20 retrieves a cap 41 including the light emitter 42 from a second a magazine (not shown) housing a series of caps 41 which it inserts into the internal groove 39 of the receptacle winglet 37 of the body 34 previously inserted and pressed into the service entrance.

Once all the service entrances 14, 16 and 18 are plugged with the plugs 32 or 33 comprising a light emitter 42, the segment of underground water main conduit 10 may be re-lined. A tubular membrane 50 comprising of a pair of concentric circular weave polyester fiber hoses impregnated with epoxy resin is introduced inside the water main conduit 10. The tubular membrane is cooked with hot water under pressure such that the tubular membrane 50 adheres to the inner wall of the water main conduit 10. In the cooking operation, the resin migrates into the circular weave polyester fibre hoses and renders the tubular membrane 50 semi transparent when the resin has cured. As illustrated in FIG. 5, when the tubular membrane 50 has cured and solidified, the multiple holes, cracks or punctures 12 of water main conduit 10 described with reference to FIG. 1 are completely covered and the water main conduit 10 is watertight. In the process, the service entrances 14, 16 and 18 are also completely covered by the tubular membrane 50.

Once the tubular membrane 50 has cured and solidified, the service entrances 14, 16 and 18 must be located and the plugs 32 or 33 drilled out in order to re-open the service entrances 14, 16 and 18 to supply water to the residences or businesses linked to the water main conduit 10 through the service entrances 14, 16 and 18.

To locate the plugs 32 or 33 and drill them out, a drilling robot 60 connected to a closed circuit camera 22 and a generator 61 are introduced together into the tubular membrane 50 of the water main conduit 10 as illustrated in FIG. 6. The drilling robot 60, the camera 22 and the generator 61 are connected together as an assembly through tension cables 24. The drilling robot 60 and the generator 61 are respectively connected to tension cables 27 and 29 which are connected to a pair of winches (not shown) located above ground and operated by a technician. The assembly of the drilling robot 60, the camera 22 and the generator 61 is moved back and forth inside the water main conduit 10 by actuated one of the winches which pulls on one of the tension cables 27 and 29 while the other winch offers little resistance. The drilling robot 60 and the generator 61 are mounted on low friction pads 64 such that they can slide on the inside of the tubular membrane 50 within the water main conduit 10. The assembly is remotely operated by the technician looking at a television monitor (not shown) relaying live images captured by the camera 22.

The drilling robot 60 comprises a main body 62 housing a power unit and actuator for controlling a drilling head 66 positioned at the front of the drilling robot 60. The drilling head 66 includes a drill bit 68 extending perpendicular to main body 62 and the longitudinal axis of the water main conduit 10. The drilling head 66 is rotatable about an axis extending in a horizontal direction and also movable back and forth along the same axis such that the technician is able to precisely align the drill bit 68 with service entrances located in any position around the circumference of the water main conduit 10.

Figure 7:
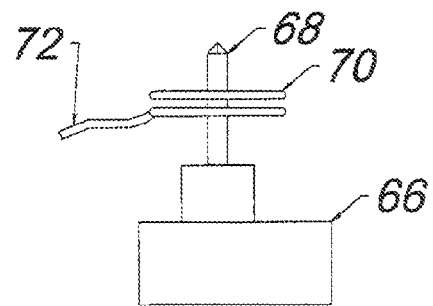
FIG. 7 is a schematic side elevational view of a drilling head of the plug detection and drilling apparatus in accordance with one embodiment.
Figure 8:
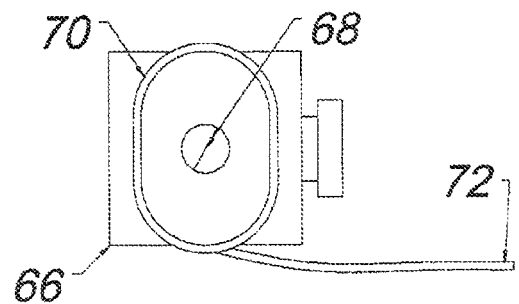
FIG. 8 is a schematic top plan view of the drilling head of FIG. 7.

With reference to FIGS. 7 and 8 which are enlarged views of the drilling head 66, a coil inductor 70 is mounted on the drilling head 66. The winding of the coil inductor 70 is concentric with the axis of the drill bit 68 and preferably oval shaped as illustrated in FIG. 8 in order to provide a wider sweep than a regular round shape. Referring back to FIG. 6, the generator 61 is electrically connected directly to the coil inductor 70 through an electrical wire 72 to provide the required electrical current to the coil inductor 70. When an electrical current flows through the coil inductor 70, the coil inductor 70 generates an electromagnetic field.

With reference to FIG. 6, in operation, the drilling robot 60 is moved inside the water main conduit 10 by the technician into an area where one of the service entrances 14, 16, or 18 was plugged by a plug 32 or 33. The technician then activates the coil inductor 70 to generate an electromagnetic field. When the electromagnetic field generated by the coil inductor 70 is in the vicinity of a plug 32 or 33, the antenna coil 40 of the plug 32 or 33 generates a small electrical current that turn on the light emitter 42. The semi transparent characteristic of the tubular membrane 50 allows the light emitted by the light emitter 42 to pass through the tubular membrane 50 such that the light can be seen by the technician through the camera 22 positioned directly in front of the drilling head 66. The light emitted is preferably red and flashing for ease of detection.

The technician is able, through the camera 22, to visually align the end of the drill bit 68 with the flashing red light by moving the drilling robot 60 back and forth, by rotating the drilling head 66, and moving the drilling head 66 up and down to be as close as possible to the surface of the tubular membrane 50 and to the flashing red light such that the end of the drill bit 68 is precisely aligned with the plug 32 located behind the tubular membrane 50. Since the light emitter 42 is exactly in the center of the plug 32 or 33 as previously described, the alignment of the end of the drill bit 68 with the flashing red light aligns the drill bit 68 with the center of the plug 32 or 33 and therefore the center of the service entrance 14. Once the alignment is done, the technician actuates the drill bit 68 and proceeds with drilling out the plug 32 or 33 by moving the drilling head 66 through the tubular membrane 50 and through the plug 32 or 33 located behind the tubular membrane 50 far enough to completely drill out the plug 32 or 33. The drilling head 66 is then retrieved and the drilling robot 60 is moved into an area where another of the service entrances 14, 16, or 18 was plugged by a plug 32 or 33 and the cycle of detection, alignment and drilling is repeated until all the plugs 32 or 33 have been drilled out and all the service entrances 14, 16 and 18 reopened.

The combination of the tight emitter 42 positioned at the center of the plug 32 or 33 responsive to the electromagnetic field generated by the coil inductor 70 enables the technician to visually align the drill bit 68 with the center of the plug 32 or 33 as opposed to relying on some other signals which has the beneficial effect of accelerating the drilling process and therefore accelerating the reopening of the water main conduit 10 after rehabilitation.

Modifications and improvements to the above-described embodiments may become apparent to those skilled in the art. The foregoing description is intended to be exemplary rather than limiting. The scope of the present invention is therefore intended to be limited solely by the scope of the appended claims.

What is claimed is:

1. A service entrance plug for use in rehabilitating an underground water conduit as defined comprising:
    a body having first and second ends, wherein the first end is adapted for insertion into a service entrance and the second end is adapted to be visually seen within the underground water conduit;
    a light emitter disposed on the second end; and
    at least one antenna coil connected to the light emitter, the antenna coil being adapted to generate an electrical current when subjected to an electromagnetic field that will turn on the light emitter.

2. The service entrance plug of claim 1 further wherein the body is a conical hollowed body surrounded by a plurality of spaced flexible winglets.

3. The service entrance plug of claim 2, wherein the light emitter is located in the center of the second end of the plug.

4. The service entrance plug of claim 3, wherein a first one of said plurality of spaced flexible winglets is disposed at the second end of the plug, and wherein the first one of the plurality of spaced flexible winglets has a larger diameter than other spaced flexible winglets.

5. The service entrance plug of claim 4, wherein the first one of the plurality of spaced flexible winglets is thicker than other spaced flexible winglets.

6. The service entrance plug of claim 2, wherein the second end of said body is formed as a cap, into which is embedded the antenna coil connected to the light emitter.

7. The service entrance plug of claim 6, wherein the second end of the body comprises a receptacle winglet adapted to mate with an internal groove provided in the cap.

8. The service entrance plug of claim 7, wherein the cap is snapped into the second end of the body.

\* \* \* \* \*